United States Patent [19]
Gopp et al.

[11] Patent Number: 5,690,083
[45] Date of Patent: Nov. 25, 1997

[54] EXHAUST GAS RECIRCULATION CONTROL SYSTEM

[75] Inventors: Alexander Y. Gopp, Ann Arbor; Shailesh Patel, Garden City, both of Mich.

[73] Assignee: Ford Global Technologies, Inc., Dearborn, Mich.

[21] Appl. No.: 734,567

[22] Filed: Oct. 21, 1996

[51] Int. Cl.$^6$ .......................... F02M 25/07; H01H 47/00
[52] U.S. Cl. ........................................ 123/571; 361/153
[58] Field of Search ...................... 123/568, 569, 123/571; 251/129.15; 361/152, 153, 154

[56] References Cited

U.S. PATENT DOCUMENTS

| | | | |
|---|---|---|---|
| 4,500,937 | 2/1985 | Matt | 361/153 |
| 4,604,983 | 8/1986 | Carp et al. | 123/571 |
| 5,245,501 | 9/1993 | Locher et al. | 361/154 |
| 5,270,900 | 12/1993 | Alden et al. | 361/153 |
| 5,381,297 | 1/1995 | Weber | 361/154 |
| 5,533,489 | 7/1996 | Socci et al. | 23/571 |

*Primary Examiner*—Willis R. Wolfe
*Attorney, Agent, or Firm*—Allan J. Lippa; Roger L. May

[57] ABSTRACT

An EGR control system provides on-line adaptation of the EGR valve Start to Open value during normal vehicle operations. The adaptive logic determines whether the valve position output signal reaches a predetermined minimum output signal value within a desired predetermined time window defined by upper and lower time values. If outside the window, the initial duty cycle value applied to the EGR valve is increased or decreased as appropriate to force the output signal to reach the minimum value within or at the boundaries of the time window.

10 Claims, 2 Drawing Sheets

5,690,083

EXHAUST GAS RECIRCULATION CONTROL SYSTEM

TECHNICAL FIELD

This invention relates to systems for controlling exhaust gas recirculation (EGR) and, more particularly, to an EGR control system that provides an on-line adaptation of the EGR valve Start to Open duty cycle value.

BACKGROUND ART

The conventional EGR system includes a valve positioned by a PID controller in response to a signal from an engine controller based on engine operating conditions. The valve serves to allow a small portion of the exhaust gases to flow from the exhaust manifold into the intake manifold to reduce NOx emissions and improve fuel economy. The EGR valve driver converts a duty cycle (DC) signal from the PID controller to either an electrical control signal or a pneumatic control signal depending on the type of valve actuator. One of the problems with prior art EGR systems arises from the hysteresis associated with the EGR valve. An important parameter of this characteristic is the so called Start to Open (STO) duty cycle value. In order to start to move the EGR valve, the duty cycle signal must be larger than STO. If the initial duty cycle is less than STO, control actions may be greatly delayed. On the other hand, if the initial duty cycle is much larger than STO, the valve tends to overshoot the desired position.

The value of STO is affected by many parameters, for example, manufacturing variability, coil resistance, EGR system temperature, EGR valve contamination and aging. At the same time, the STO value is a calibration parameter used by the PID controller to calculate the initial duty cycle to start EGR valve opening. To mitigate the problem, a conservative approach to control is used in order to avoid EGR flow overshoot. This, however, leads to a delay of EGR control actions on tip-ins.

SUMMARY OF THE INVENTION

In accordance with the present invention, an EGR control system is proposed that provides on-line adaptation of the Start to Open value during normal vehicle operations. The adaptive logic includes a timer activated each time EGR control is activated, and comparator logic that determines whether the valve position output signal reaches a predetermined minimum output signal value within or outside a predetermined time window defined by upper and lower time values. If the output signal reaches the predetermined minimum output signal value after the desired time window has expired, the adaptive logic increments the initial duty cycle value by a small amount. On the other hand, if the output signal reaches the predetermined minimum output signal value before the desired time window begins the adaptive logic decrements the initial duty cycle value by a small amount. The adaptive logic thereby forces the output signal to cross the minimum output value within or at the boundaries of the time window, thus compensating for the aforementioned effects which tend over time to render erroneous the original calibration value for STO.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
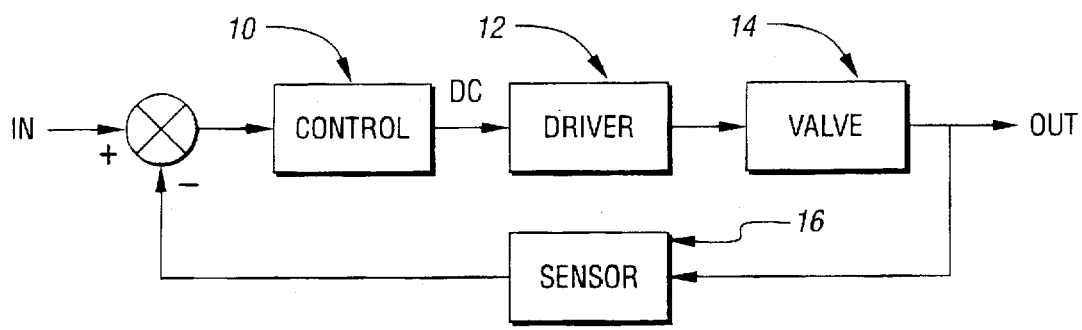
FIG. 1 is a block diagram of a conventional EGR control system.

Referring now to the drawings, and initially to FIG. 1, a block diagram of a typical EGR control system is shown. The system comprises a control block 10 which includes a PID controller and associated logic to engage or disengage control actions. During normal operations, this engagement of control actions typically happens each time a throttle is moved from a closed position, and disengagement occurs each time a throttle is moved to a closed position. A driver 12 converts the duty cycle signal from the control block 10 to a signal for actuating an EGR valve 14. The driver 12 provides an electrical signal where an electrically actuated EGR valve is used or a pneumatic signal where a vacuum actuated EGR valve is used. Sensor 16 is a position sensor for Position Control EGR or a delta pressure sensor for a dPFE control system.

Input signal IN is generated by an engine control system (not shown) as a function of engine operation conditions such as engine speed, load, coolant temperature and the like. When operation conditions require no EGR flow, for example, during closed throttle operation, control block 10 outputs a zero duty cycle signal, i.e., zero output, and control actions by the PID controller cease to exist.

Figure 2:
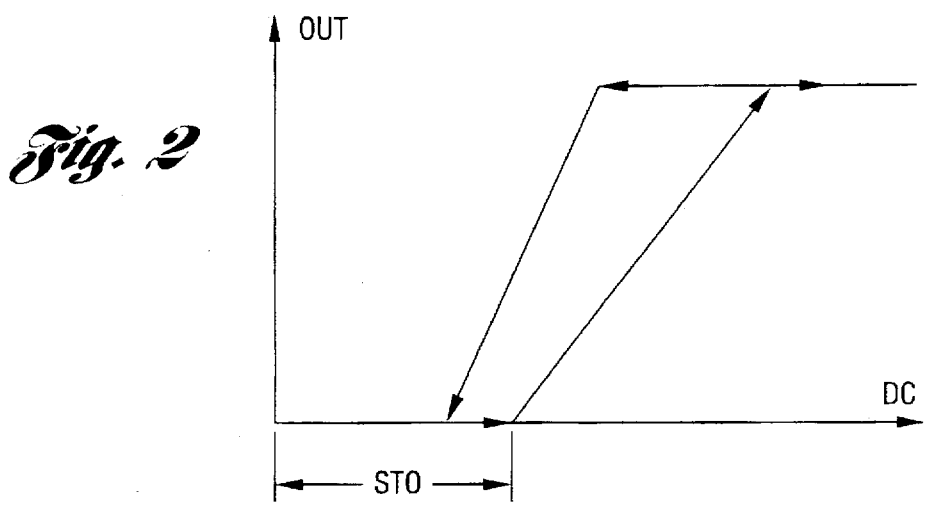
FIG. 2 is plot of a typical hysteresis characteristic.

The relationship between the controller output duty cycle and the EGR valve output OUT includes hysteresis, as shown in FIG. 2. An important parameter of this hysteresis characteristic is the so called Start to Open (STO) duty cycle value. The EGR valve 14 will not start to move and generate the output signal OUT until the duty cycle signal is larger than STO (DC >STO). If the initial duty cycle DC_INIT is less than STO, control actions may be greatly delayed. On the other hand, if the initial duty cycle is much larger than STO, this leads to fast control actions and overshoot of the desired position.

The value of STO is a calibration parameter used by the PID controller to calculate the initial duty cycle DC_INIT to start EGR valve opening. The value of STO is affected by many parameters, for example, manufacturing variability, coil resistance, EGR system temperature, EGR valve contamination and aging. It is the usual practice of calibration to take a conservative approach and assign a small STO value to avoid EGR flow overshoot. However, this leads to a delay of EGR control actions on tip-ins.

Figure 3:
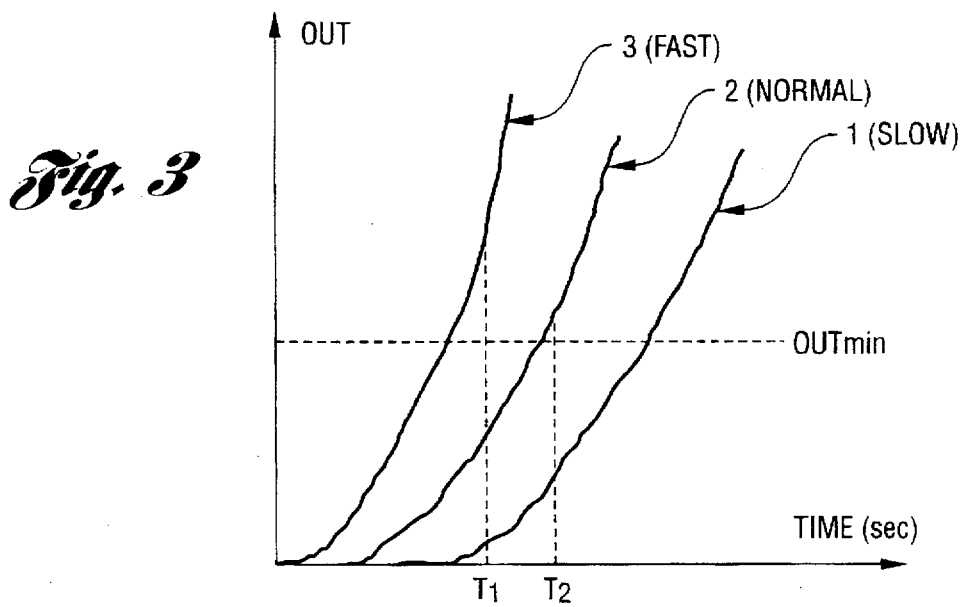
FIG. 3 is a plot of the output response of the EGR valve to different start to open values.
Figure 4:
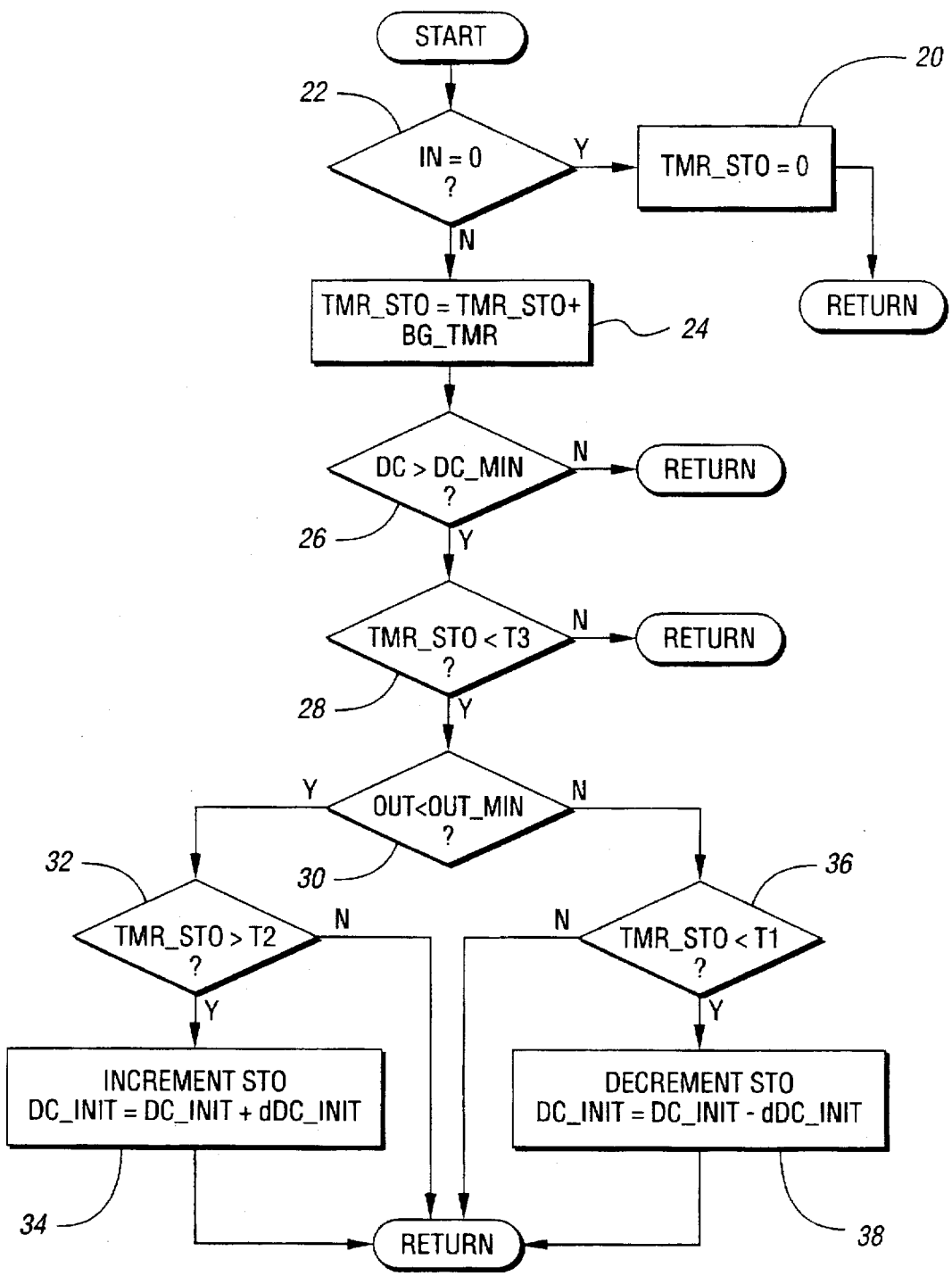
FIG. 4 is a flowcharts of the adaptive start to open control scheme of the present invention.

The control system of the present invention provides on-line adaptation of the Start to Open value during normal vehicle operations. The adaptive logic is depicted in the flowchart of FIG. 4 and includes a timer activated each time EGR control is engaged, and comparator logic which compares the output signal OUT with a preset value OUT_MIN at certain preset times. Referring now to FIG. 3, the operations of the comparator will be explained with reference to the three curves numbered 1, 2 and 3.

Curve 1 (Slow) shows the valve output OUT when DC_INIT is less than desired, and OUT reaches the value OUT_MIN after preset time T2 counted by the timer from the time of the start of control actions. This late crossing causes the adaptive logic to increment the initial duty cycle DC_INIT by the small amount dDC_INIT. Thus, the next time control actions are initiated, DC_INIT value will be larger, and curve 1 (Slow) will move in the direction of curve 2 (Normal).

Curve 3 (Fast) shows valve output OUT when DC_INIT is larger than desired, and OUT reaches the value OUT_MIN before another preset time T1 counted by the timer from the time of the start of control actions. This advanced crossing causes the adaptive logic to decrement the initial duty cycle DC_INIT by the same amount dDC_INIT. Thus the next time control actions are initiated, DC_INIT value will be smaller, and curve 3 (Fast) will move in the direction of curve 2 (Normal). Thus, the adaptive logic forces the output signal OUT to cross the value OUT_MIN within or at the boundaries of a time window represented by times T1 and T2, thus removing the effects of variation in the value of STO.

Referring now to FIG. 4, a flowchart of a routine for adapting the STO value is shown. A timer TMR_STO is reset at block 20, if the engine control input signal IN is equal to 0 as determined by the decision block 22. Otherwise TMR_STO is incremented by the sampling time interval BG_TMR, at block 24. Control returns to the main program if the duty cycle DC is not greater than a predetermined minimum duty cycle DC_MIN, as determined at decision block 26, or TMR_STO is equal to or greater than a predetermined time T3, as determined at decision block 28. T3 is a time interval of such value that if TMR_STO reaches this value T3, the EGR valve is very likely stuck or otherwise malfunctioning.

However, if both conditions defined in blocks 26 and 28 are met, then the valve output signal OUT is compared with a predetermined value OUT_MIN, at decision block 30. If OUT is less than OUT_MIN, then the timer TMR_STO is checked to determined if TMR_STO is greater than the time value T2, as determined at decision block 32. If so, then the initial duty cycle value DC_INIT is incremented by a predetermined amount dDC_INIT at block 34 and control returns to the main program. Thus, if OUT does not reach OUT_MIN prior to T2, the initial duty cycle value dDC_INIT is incremented. With a larger DC_INIT value, the next time through the loop OUT will reach OUT_MIN sooner and eventually at time T2.

Otherwise, if OUT is equal to or greater than OUT_MIN, as determined at block 30, and the timer TMR_STO is less than T1, as determined at block 36, then the initial duty cycle value DC_INIT is decremented by the predetermined amount dDC_INIT at block 38 and control returns to the main program. Thus, if OUT reaches OUT_MIN prior to T1, the initial duty cycle value dDC_INIT is decremented. With a smaller DC_INIT value, the next time thought the loop OUT will reach OUT_MIN later and eventually at time T1. The software timer TMR_STO may be replaced by a counter if the control system has a constant sampling time. In this case, times T1, T2, and T3 are replaced by numbers of control cycles to the desired results.

While the best mode for carrying out the present invention has been described in detail, those familiar with the art to which this invention relates will recognize various alternative designs and embodiments for practicing the invention as defined by the following claims.

What is claimed is:

1. A method of adaptively adjusting a controller start to open calibration value in an exhaust gas recirculation (EGR) control system comprising a sequence of the following steps:

activating EGR control with a signal including an initial duty cycle value in response to an input signal from an engine control system;

comparing an output signal representing EGR valve output to a predetermined signal threshold;

adjusting said initial duty cycle value if following activation, said output signal reaches said threshold before a predetermined lower time interval has expired or after a predetermined upper time interval has expired.

2. The method of claim 1 wherein said value is increased by a predetermined amount if said upper time interval expires before said output signal exceed said threshold.

3. The method of claim 2 wherein said value is decreased by a predetermined amount if said lower time interval expires before said output signal is equal to or greater than said threshold.

4. The method of claim 3 including the step of initiating a timer upon activation of said EGR control;

comparing the content of said timer with said predetermined upper and lower time intervals; and comparing the content of said timer with a third predetermined time interval indicative of valve deterioration.

5. A method of adaptively adjusting a controller start to open calibration value in an exhaust gas recirculation control system comprising a sequence of the following steps:

activating EGR control with a signal including an initial duty cycle value DC_INIT in response to an input signal from an engine control system;

comparing an output signal OUT representing EGR valve position to a predetermined signal threshold OUT_MIN;

increasing the value DC-INIT by an amount dDC_INIT if, following activation, the signal OUT reaches OUT_MIN after closure of a time window having an upper limit T2 and a lower limit T1; and decreasing the value DC-INIT by said amount dDC_INIT if, following activation, said signal OUT is equal to or greater than said threshold prior to the opening of said time window.

6. An exhaust gas recirculation (EGR) control system for adaptively adjusting a controller start to open calibration value, comprising:

means responsive to an input signal from an engine control system for activating EGR control with a signal including an initial duty cycle;

means for comparing an output signal representing EGR valve position to a predetermined signal threshold; and means for adjusting said initial duty cycle value unless said output signal reaches said threshold within upper and lower time intervals following activation.

7. The system of claim 6 wherein said means for adjusting said value includes means for incrementing said value by a predetermined amount if said upper time interval expires before said output signal exceed said threshold.

8. The method of claim 7 wherein said means for adjusting said value includes means for decrementing said value by a predetermined amount if said lower time interval expires before said output signal is equal to or greater than said threshold.

9. The system of claim 6 wherein said means for adjusting said value includes means for increasing said initial duty cycle value by a predetermined amount if, following activation, a first relatively long predetermined time interval expires before said output signal exceed said threshold, and for decreasing said initial duty cycle value by said predetermined amount unless, following activation, a second relatively short predetermined time interval expires before said output signal is equal to or greater than said threshold.

10. The system of claim 9 including a timer initiated upon activation of said EGR control;

means for comparing the content of said timer with said predetermined upper and lower time intervals; and mean for comparing the content of said timer with a third predetermined time interval indicative of valve deterioration.

* * * * *